United States Patent
Wong et al.

(10) Patent No.: US 11,893,174 B1
(45) Date of Patent: Feb. 6, 2024

(54) INFORMATION HANDLING SYSTEM MOUSE GESTURE TO SUPPORT TRANSFER OF VISUAL IMAGES IN A MULTI-DISPLAY CONFIGURATION

(71) Applicant: Dell Products L.P., Round Rock, TX (US)

(72) Inventors: Kai Leong Wong, Singapore (SG); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/975,958

(22) Filed: Oct. 28, 2022

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01)

(58) Field of Classification Search
CPC ............................. G06F 3/038; G06F 3/03543
See application file for complete search history.

(56) References Cited

U.S. PATENT DOCUMENTS

| | | | |
|---|---|---|---|
| 7,614,019 B2 | 11/2009 | Ribikauskas et al. | |
| 8,751,970 B2* | 6/2014 | Hinckley | G06F 3/0416 345/173 |
| 8,963,836 B2 | 2/2015 | Cheng et al. | |
| 10,019,081 B2* | 7/2018 | Buchanan | G06F 3/038 |
| 10,599,233 B1* | 3/2020 | Amalou | G06F 3/0346 |
| 11,079,995 B1* | 8/2021 | Hulbert | G06F 3/0485 |
| 2005/0044058 A1* | 2/2005 | Matthews | G06F 9/4418 |
| 2005/0078087 A1* | 4/2005 | Gates | G06F 3/0383 345/163 |
| 2006/0274042 A1* | 12/2006 | Krah | G06F 3/03543 345/163 |
| 2009/0278801 A1* | 11/2009 | Cheng | G06F 3/0383 345/163 |
| 2010/0333170 A1* | 12/2010 | Cox | G06F 3/03543 711/E12.001 |
| 2014/0028554 A1 | 1/2014 | de los Reyes | |
| 2015/0138089 A1 | 5/2015 | Anderbauer et al. | |
| 2015/0309668 A1* | 10/2015 | Sun | G06F 3/04845 715/783 |
| 2017/0351396 A1* | 12/2017 | Passeri | G06F 3/011 |
| 2022/0206667 A1* | 6/2022 | Zhang | G09G 5/08 |

* cited by examiner

*Primary Examiner* — Ariel A Balaoing
(74) *Attorney, Agent, or Firm* — ZAGORIN CAVE LLP; Robert W. Holland

(57) ABSTRACT

An information handling system mouse autonomously provides a rapid visual image transition from a first display to a second display in response to a predetermined condition detected at the mouse, such as a left click that an end user performs when on the visual image title bar accompanied by a gesture or a hot key input. The mouse responds to the inputs by commanding an acceleration of movement of the cursor coordinates so that the information handling system rapidly moves the visual image from the first display to the second. In various embodiments, the movement can include a selection to go to a full screen presentation or to keep the visual image size the same. The visual image transfer is performed without any coordination with the information handling system other than commanding cursor coordinate movements.

20 Claims, 4 Drawing Sheets

INFORMATION HANDLING SYSTEM MOUSE GESTURE TO SUPPORT TRANSFER OF VISUAL IMAGES IN A MULTI-DISPLAY CONFIGURATION

BACKGROUND OF THE INVENTION

Field of the Invention

The present invention relates in general to the field of information handling system peripheral interactions, and more particularly to an information handling system mouse gesture to support transfer of visual images in a multi-display configuration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing. Stationary configurations, such as desktop information handling systems, have fixed housings that typically interact with end users through peripheral input/output (I/O) devices. For instance, a peripheral keyboard and mouse accept end user inputs and a peripheral display presents information as visual images. Portable information handling systems integrate processing components, a display and a power source in a portable housing to support mobile operations. Portable information handling systems allow end users to carry a system between meetings, during travel, and between home and office locations so that an end user has access to processing capabilities while mobile. After usage, convertible information handling systems rotate the lid housing portion over the main housing portion to protect the keyboard and display, thus reducing the system footprint for improved storage and mobility. Portable information handling systems will also typically interact with peripheral I/O devices, which tend to offer larger and more convenient input and output interfaces.

In many instances, end users configure information handling systems to interact with multiple displays to present visual images. In a multi-display configuration, the system graphics processor scans visual images to each display so that the end user can select visual images at any of the displays to interact with. For instance, an end user can maximize a word processing document on one display while viewing multiple windows on another display that each provide source information to reference when writing the document. The end user can select a window as active across any of the displays by moving the mouse cursor over the window, in a manner similar to the interactions with a single display configuration. The end user moves the cursor between the displays with a conventional mouse input. The mouse detects movement on a support surface with a position sensor and sends cursor coordinates to the information handling system, which applies the cursor coordinates across the multiple displays. As the cursor coordinates pass from one display to the next, the cursor is moved to the appropriate display by the information handling system. Cursor position is managed in a variety of manners through cooperation between the communication interface, such as USB or BLUETOOTH, an embedded controller that manages input device interactions, a graphics controller that presents the visual images by generating pixel values and the system CPU that applies the cursor position as an input for the CPU.

One difficulty that can arise in multi-display configurations is that a mouse cursor position change is delayed when the information handling system is managing large amounts of information. As an example, when an end user clicks on a window title bar to drag the visual image of the window to a new location, delays in the movement may take place as the window crosses from a first display for presentation at a second display. These delays can confuse an end user who might release the window title bar click before the move is complete, resulting in the window remaining in the first display. The end user then has to perform another click, drag and drop operation.

SUMMARY OF THE INVENTION

Therefore, a need has arisen for a system and method which provides a reliable transfer of a window having a visual image from a first display to a second display with a mouse interaction.

In accordance with the present invention, a system and method are provided which substantially reduce the disadvantages and problems associated with previous methods and systems for moving a window of visual images from a first display to a second display with a mouse interaction. A processing resource executing on the mouse detects a predetermined condition associated with a transition of a visual image from a first to a second display and, in response, accelerates movement of the visual image across the separation of the displays.

More specifically, an information handling system presents visual images at each of multiple displays interfaced with the information handling system. A mouse interfaced with the information handling system detects movement with a position sensor and reports the movement as cursor coordinates to the information handling system, which applies the cursor coordinates to move the cursor from an existing position in a conventional manner. When the mouse reports a left button click and the cursor is on a window title bar, the information handling system drags the window and its visual image contents based upon the cursor coordinates reported by the mouse in a conventional manner. When the mouse processing resource detects a left click associated with dragging a window and a secondary indication associated with dragging the window across a display divide, the mouse accelerates movement of the window by reporting an increased rate of cursor coordinates movement so that the information handling system receives direction from the mouse to move the window from the first to the second display in a shorter time frame. The secondary indication may include a gesture, such as a flick of the mouse, a hot key input or other indication as described below.

The present invention provides a number of important technical advantages. One example of an important technical advantage is that a mouse commands transfer of a visual image from a first display to a second display in a more rapid manner without any specialized commands or coordination with the information handling system. The accelerated cursor coordinates result in a rapid transition from the first to the second display to avoid hang ups in the window movement that can confuse an end user and detract from the end user's experience. The window at transfer to the second display may automatically open to a maximum or full display presentation, or may maintain the same size as at the first display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A mouse automates movement of a visual image presented by an information handling system at a first display to a second display by accelerating cursor coordinate positions without a function-specific application executing on the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
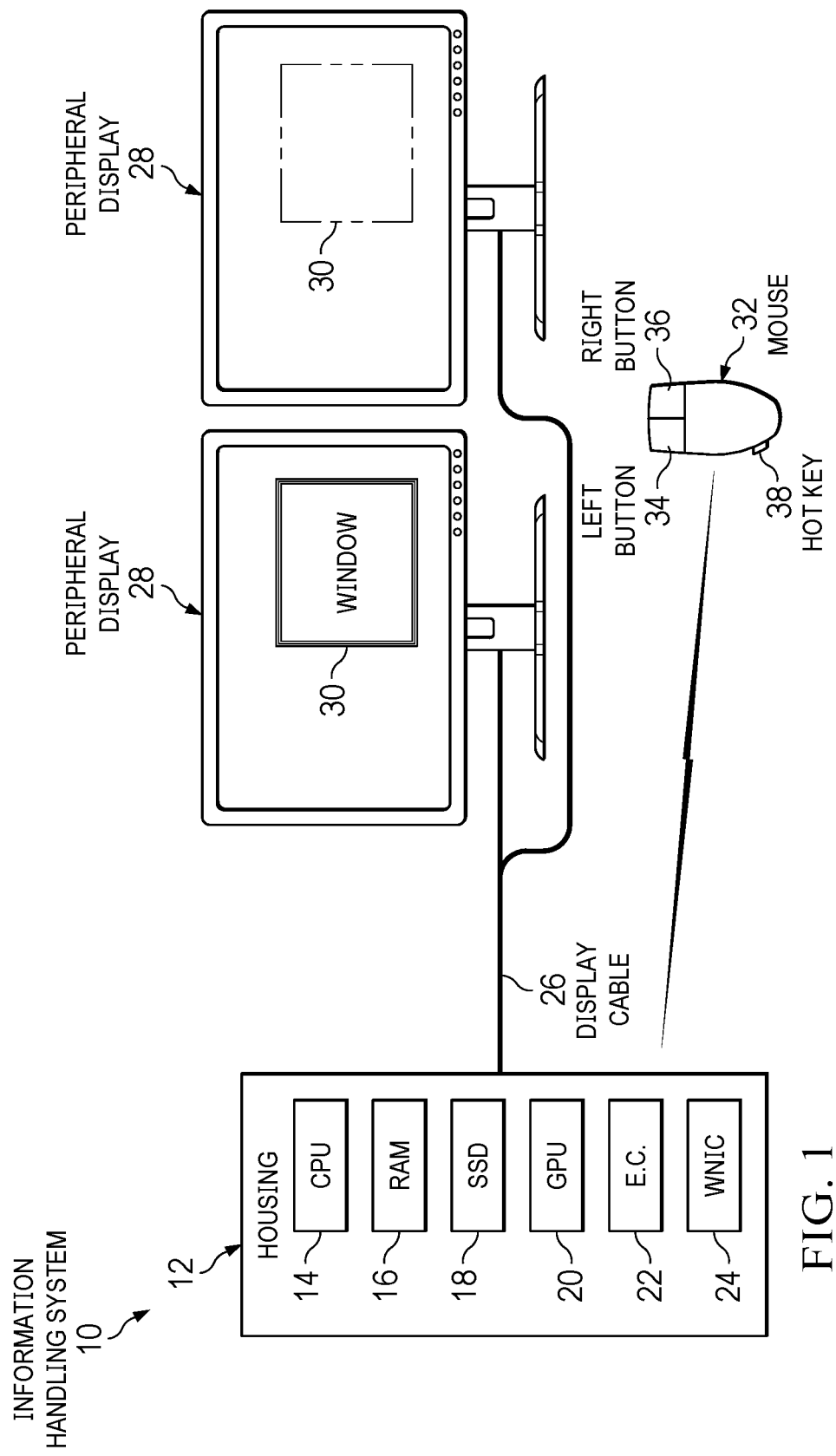
FIG. 1 depicts a block diagram of an information handling system mouse configured to accelerate movement of a visual image between first and second peripheral displays.

Referring now to FIG. 1, a block diagram depicts an information handling system 10 mouse 32 configured to accelerate movement of a visual image between first and second peripheral displays 28. Information handling system 10 processes information with processing components disposed in a stationary housing 12, such as a desktop configuration. In alternative embodiments, a portable configuration may be used in a similar manner, such as a clamshell or tablet configuration. A central processing unit (CPU) 14 executes instructions that process information in cooperation with a random access memory (RAM) 16 that stores the instructions and information. A solid state drive (SSD) 18 provides persistent storage of information and instructions, such as an operating system and applications. The operating system, for example, includes drivers that coordinate interactions with peripheral devices. A graphics processing unit (GPU) 20 interfaces with CPU 14 to further process information for presentation as visual images at peripheral displays 28, such as through a display cable 26. An embedded controller 22 interfaces with CPU 14 and provides management of processing components on a physical level, such as with application of power and maintaining thermal constraints. In addition, embedded controller 22 supports interactions with peripheral devices, such as a keyboard and mouse. The position of a mouse cursor on a peripheral display 28 is managed in a conventional manner through cooperation between the embedded controller 22, which receives mouse cursor coordinates and provides the cursor coordinates to CPU 14 as an input and to GPU 20 for presentation at the display. A wireless network interface controller (WNIC) 24 supports wireless communication with external peripherals and networks, such as through BLUETOOTH and WiFi. In alternative embodiments, other communication interfaces may be used, such as USB.

Information handling system 10 presents visual images at peripheral displays 28 in windows 30, such as with the WINDOWS operating system. Visual images may be presented in a maximized format that has the window in the entirety of the display area, or in a partial format that has a window presented in a part of the display area as shown in FIG. 1. An end user selects a window 30 as the active content by clicking on the window with a mouse button input in a conventional manner. For example, the end user moves mouse 32 to change the position of a cursor presented on peripheral displays 28, typically as an arrow, and presses the left mouse button 34 when the cursor is over the window 30 that the end user desires to interact with. When a window 30 is active, keyboard inputs to information handling system 10 are directed to content of that window. The end user can select to maximize window 30 by clicking a maximize icon in the upper right side of the window. When the window is maximized, the end user can select a partial window presentation by selecting a partial window presentation icon that replaces the maximize icon when a partial window is presented. When window 30 is in a partial presentation format, the end user can click on a title bar at the top of the window to drag the window to different positions. One feature of WINDOWS is that clicking and dragging on a maximized window will transition the window to a partial presentation format. Another feature is that dragging a window to an upper right corner of a display will cause the window to maximize. The window sized is managed by the operating system based upon a mouse cursor position and window presentation position. Other techniques for changing the window presentation format can include a click of mouse right button 36 to open a menu and selection of the presentation format from the menu.

In the example embodiment, window 30 is depicted as being dragged from the left side peripheral display 28 to the right side peripheral display 28. The end user performs the window drag by clicking on the window title bar with a left mouse click and then sliding the mouse to the right so that the position sensor detects the motion and reports changes to the mouse cursor coordinates. With the left button held and the cursor position on the title bar, the operating system commands a drag of the presentation position of window 30 to follow the mouse cursor position. For instance, conventional mouse interaction linearly maps X, Y coordinates reported for mouse movement with a dependence based upon mouse moving speed, moving resolution expressed as dot per inch (DPI) and stopping of movement when mouse movement is detected. In order to provide a more smooth transition of a visual image in a window 30 between first and second peripheral displays 28, logic executing on the mouse detects predetermined conditions associated with movement of window and automatically accelerates X, Y coordinate movement independently and without control provided from the information handling system. For instance, when a left mouse button is clicked and the mouse moved, the end user provides an indication of visual image movement, such as a flick of a wrist or other gesture on a hot key 38 button press, so that the mouse increases the rate of coordinate movement to result in a rapid window dragging presentation. The mouse independently and automatically feeds larger magnitudes of x, y coordinates per unit of time to accomplish window dragging action without tedious mouse movement. The x, y coordinates are calculated based upon display resolution, which may be provided to the mouse by the information handling system; however, no client helper application is needed to perform the automated window movement, which is performed with mouse-based logic. In the example embodiment, the acceleration technique involves increasing X, Y magnitude while maintaining the rate of relative cursor coordinate sending rates, such as a transfer rate maximum of 125 Hz. In alternative embodiments, other types of alterations in cursor coordinate reporting may be used where the mouse, without instructions or intervention by the information handling system, independently commands a more rapid window drag movement.

Figure 2:
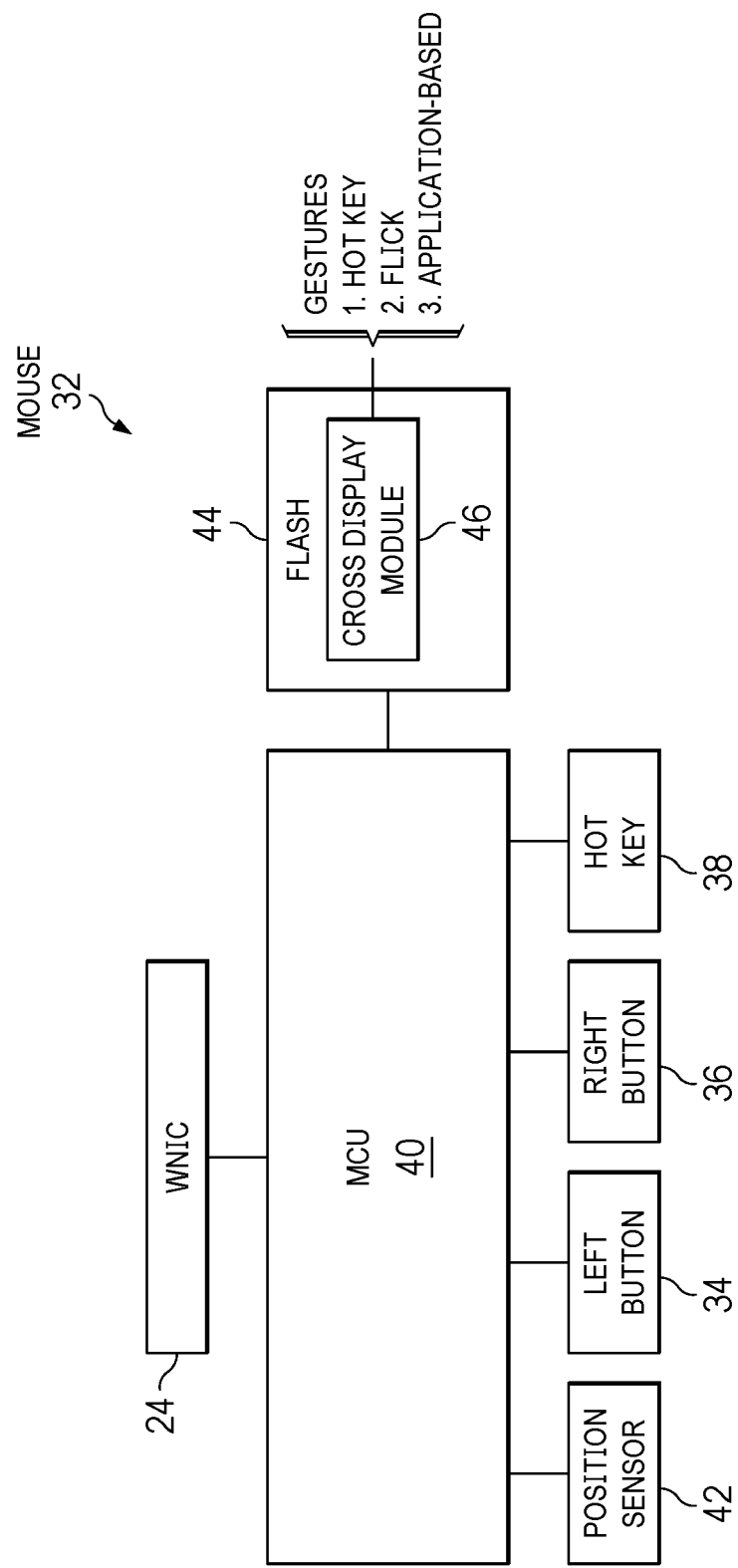
FIG. 2 depicts a block diagram of an information handling system mouse configured to accelerate movement of visual images between first and second peripheral displays.

Referring now to FIG. 2, a block diagram depicts an information handling system mouse 32 configured to accelerate movement of visual images between first and second peripheral displays. Mouse 32 includes a processing resource, such as an MCU 40, that executes instructions stored in a non-transitory memory, such as flash memory 44 to monitor end user inputs and report the inputs to an information handling system through a WNIC 24. For instance, a position sensor 42 detects mouse position movement that is reported as X, Y coordinates. In addition, the mouse accepts inputs from a left button 34, a right button 36 and a hot key 38. In the example embodiment, flash 44 stores a cross display module 46 that includes instructions to accelerate mouse coordinates that reported when a visual image is transferred between displays. The processing resource commands an acceleration in reported mouse coordinates when an end user indicates that a display transition is occurring, such as when a left button input is held plus a hot key input is made or a gesture is made, like a flick of the writes or other gesture. In addition, application based indicia may be set, such as through the mouse driver or with communication from the information handling system to the mouse that an acceleration is appropriate. For instance, in some situations the operating system might request an acceleration of coordinate movement during a drag operation. In other instances, the operating system might update the mouse of window positions, such as at the start of the drag operation, so the mouse can estimate when to accelerate coordinates to leap between displays and how far to leap.

Figure 3:
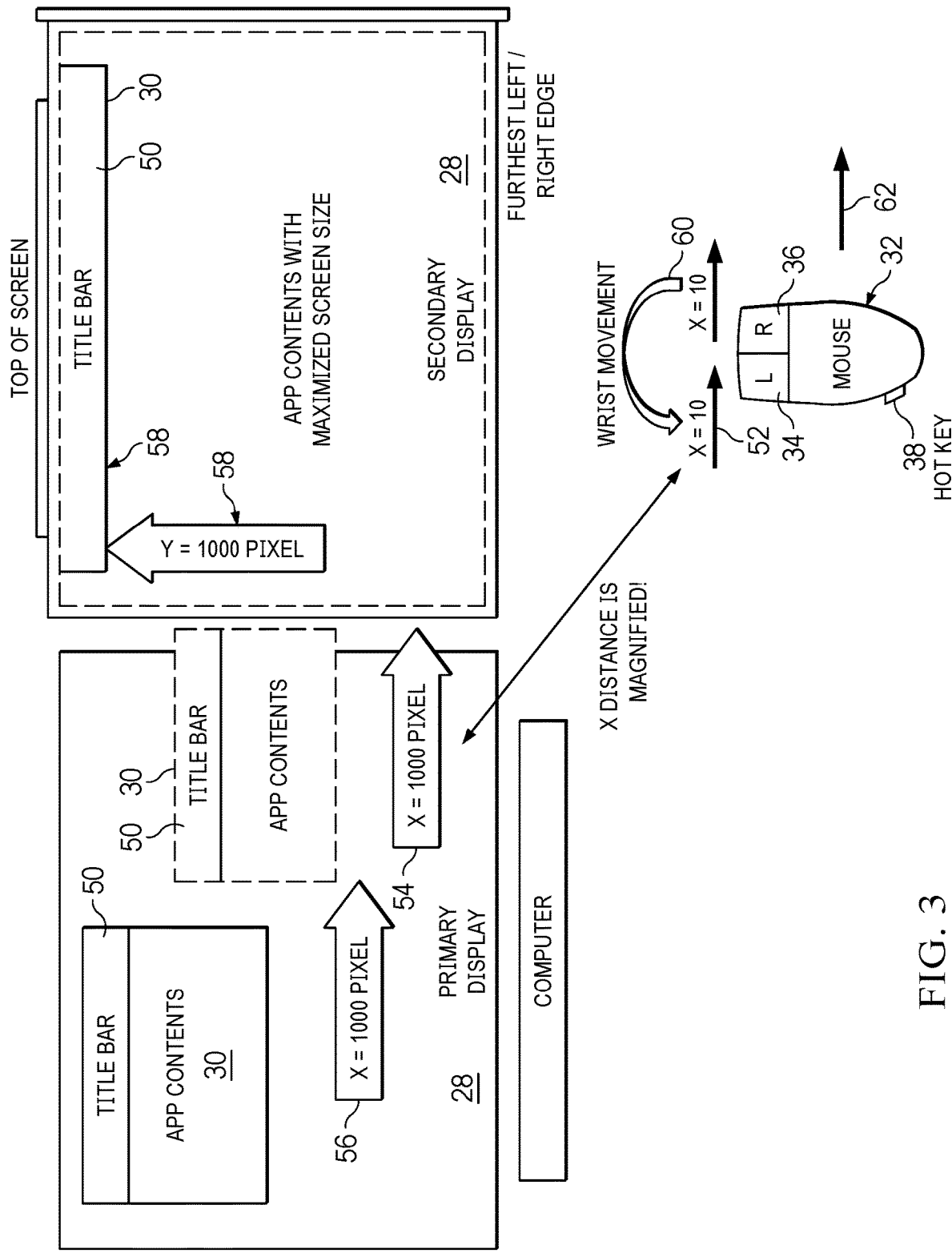
FIG. 3 depicts an example of predetermined conditions at a mouse that command accelerated movement of a visual image from a first display to a second display.

Referring now to FIG. 3, an example depicts predetermined conditions at a mouse that command accelerated movement of a visual image from a first display to a second display. In the example embodiment, mouse 32 executes an automated coordinate acceleration set of instructions that automates window movement of a visual image between peripheral displays 28 so that dragging a window 30 across displays is performed with a more rapid and natural movement. Left key 34 of mouse 32 is clicked with the mouse cursor located on a title bar 50 of the window 30. While the left mouse button click is held, a gesture 60, such as a flick of the wrist or a wrist rotation movement, is performed with the mouse and detected by the mouse processing resource based on the position sensor sensed positions. Alternatively, hot key 38 may be pressed to indicate that the end user wants an accelerated window visual image transfer, with just one of the gesture and hot key or both the hot key and gesture needed to command accelerated window transfer as indicated by arrows 52. At initiation of the accelerated window transfer, logic on the mouse detects a dragging direction 62 to determine a direction for accelerating the visual image movement. Once a direction is determined, the x coordinate value is accelerated by a predetermined amount, such as reporting 100 times the sensed movement. The accelerated movement in the example embodiment results in a movement of the visual image to the right by 1000 pixels as indicated by arrow 54. In one embodiment, each movement is repeated in 8 msec intervals until the left button is released, as indicated by arrow 56. Alternatively, movements may be commanded in increments, such as a 100 times movement acceleration at each hot key press.

In the example embodiment, automated window size and location may also be controlled autonomously from the mouse using mouse coordinates determined with logic executing on the mouse. For example, the mouse can command a number of pixels that ensures a complete movement to the far right of the second display, such as twice the number of pixels of the display, and then command an up movement with Y coordinates shown by arrow 58 to hit the top of the display so that maximum window size is commanded. Once the maximum window is commanded and the left button is released, the mouse can command a small display presentation by providing cursor coordinates to the far upper right of the display, back tracking the coordinates to arrive over the known location of the window small format icon and sending a left mouse button input at that location. From an end user perspective, the accelerated movement would show a temporary full display format followed by a small format presentation at the same location on the second display as the window was previously shown at the first display. In one embodiment, the mouse logic can track actual window locations based upon information provided from the information handling system so that the window arrives in the same position on the second display with coordinate movements estimated from the mouse.

Figure 4:
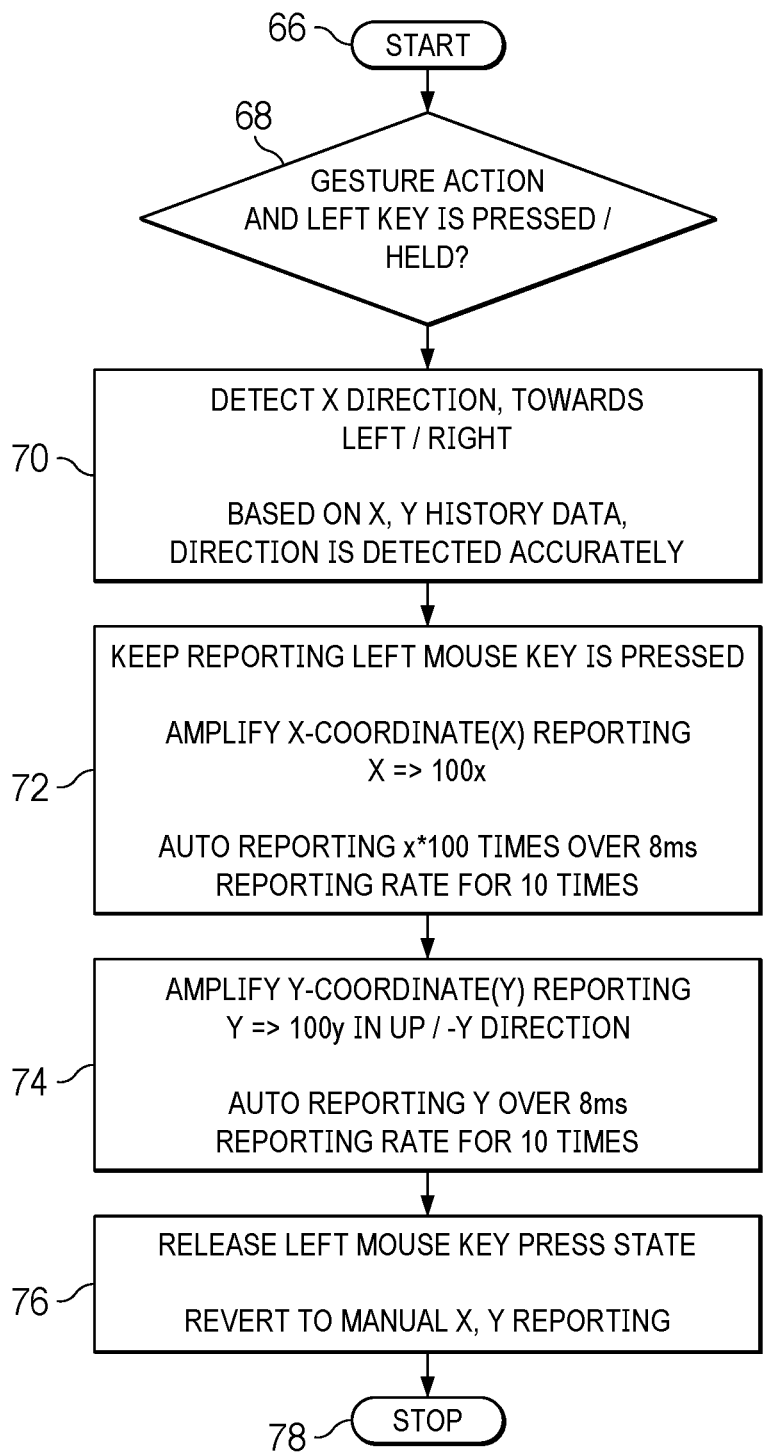
FIG. 4 depicts a flow diagram of a process for accelerating movement of a visual image between first and second display with inputs made at a mouse interfaced with an information handling system presenting the visual image.

Referring now to FIG. 4, a flow diagram depicts a process for accelerating movement of a visual image between first and second display with inputs made at a mouse interfaced with an information handling system presenting the visual image. The process starts at step 66 and at step 68 a determination is made that a left button input plus a gesture and/or a hot key input are made to command a window movement acceleration. At step 70, the mouse processing resource detects a direction of dragging of the window, such as right or left, based upon a comparison of X, Y coordinate historical data, such as from the position sensor buffer. For instance, the buffer is checked for a positive (right) or negative (left) value for a time period, such as six similar value increments to indicate a trend in movement. At step 72 with the left mouse button pressed the coordinates reported from the mouse are accelerated by 100 times in the X direction to move across a gap between the displays. In the example embodiment, the movement is repeated every 8 msec for ten intervals to complete the move across the display gap. At step 74 after completion of the movement in the X direction, an acceleration is commanded in the Y direction so that the window moves along a total vector expected by the end user from the initial detected dragging vector. The commanded movement can be set to attempt to locate the window in the same location on the second display as it had on the first display or can be set to maximize the window size with a bump against the upper right side of the display. At step 76 release of the left mouse button reverts the mouse to manual mouse reporting and the process ends at step 78.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions to process information;
   a memory interfaced with the processor and operable to store the instructions and information;
   a persistent storage device having non-transitory memory to store the instructions and information;
   first and second displays interfaced with the processor and operable to present the information as visual images; and
   a mouse interfaced with the processor, the mouse having a position sensor, plural input buttons, a processing resource and a non-transitory memory storing instructions that when executed on the processing resource cause:
   translation of movement detected by the position sensor to cursor coordinate movements;
   communication of the cursor coordinate movements to the processor; and
   acceleration of the cursor coordinate movements in response to a predetermined condition associated with movement of a visual image from the first display to the second display.

2. The information handling system of claim 1 wherein the instructions further:
   detect the predetermined condition in part as a cursor coordinate movement in a direction; and
   accelerates the cursor coordinate movement of the visual image in the direction.

3. The information handling system of claim 2 wherein the instructions further accelerate the cursor coordinate movement of the visual image in an up direction to maximize the visual image with a touch of the visual image at the top side of the second display.

4. The information handling system of claim 1 wherein the predetermined conditions are determined only at the mouse and the movement of the visual image from the first display to the second display is commanded only by cursor coordinate movements communicated from the mouse.

5. The information handling system of claim 1 wherein the predetermined conditions comprise a left mouse button input.

6. The information system of claim 5 wherein the predetermine conditions further comprise a mouse hot key input when the left mouse button input is active.

7. The information handling system of claim 5 wherein the predetermined conditions comprise a flick gesture movement with the mouse when the left mouse button is active.

8. The information handling system of claim 1 wherein the instructions further:
   receive from the processor a resolution of the first and second displays; and
   determine an amount of cursor coordinate movement based upon the resolution to achieve movement of the visual image from the first display to the second display.

9. The information handling system of claim 8 wherein the instructions further:
   command cursor coordinate movement having a direction and amount sufficient to maximize the visual image at the second display; and
   command a right mouse button input after the cursor coordinate movement and at a cursor coordinate to select presentation of the visual image at less than full screen.

10. A method for moving a visual image presented by an information handling system from a first display to a second display, the method comprising:
    detecting a predetermined condition at a mouse including at least some movement detected by a position sensor of the mouse in a direction;
    in response to the predetermined condition, commanding a cursor coordinate movement from the mouse to the information handling system in the direction and sufficient to drag the visual image from the first to the second display; and
    applying the cursor coordinate movement with the information handling system to move the visual image from the first display to the second display at an accelerated rate of greater than the cursor coordinate movement.

11. The method of claim 10 wherein the detecting a predetermined condition further comprises detecting a left mouse button input with at least some movement.

12. The method of claim 11 wherein the detecting a predetermined condition further comprises detecting a mouse hot key input when the left mouse input is active.

13. The method of claim 11 wherein the detecting a predetermined condition further comprises detecting a flick gesture movement with the mouse when the left mouse button is active.

14. The method of claim 10 wherein the detecting further comprises:
    detecting a mouse hot key input; and
    detecting flick gesture movement with the mouse when the hot key input is active.

15. The method of claim 10 further comprising:
    commanding the cursor coordinate movement in an up direction after the cursor coordinates movement sufficient to drag the visual image from the first to the second display, the up direction sufficient to reach a position of the visual image that commands a full screen; and applying the cursor coordinate movement in the up direction with the information handling system to present the visual image in a full screen presentation at the second display.

16. The method of claim 15 further comprising:

commanding a mouse right click input at a cursor coordinate position associated with reducing the visual image from the full screen presentation to less than the full screen; and applying the commanding the mouse right click to reduce the presentation size of the visual image at the second display.

17. A mouse comprising:

a position sensor;

plural input buttons;

a processing resource operable to execute instructions that process information; and a non-transitory memory storing instructions that when executed on the processing resource cause:

translation of movement detected by the position sensor to cursor coordinate movements;

communication of the cursor coordinate movements to an information handling system; and acceleration of the cursor coordinate movements in response to a predetermined condition associated with movement of a visual image from the first display to the second display.

18. The mouse of claim 17 wherein the instructions further:

detect the predetermined condition in part as a cursor coordinate movement in a direction and at a rate; and accelerates the cursor coordinate movement of the visual image in the direction and at a rate of at least one hundred times the detected rate.

19. The mouse of claim 17 wherein the predetermined condition comprises a simultaneous left mouse button input and a hotkey input.

20. The mouse of claim 17 wherein the predetermined condition comprises a simultaneous left mouse button input and a flick gesture movement with the mouse.

* * * * *